US012026764B2

(12) United States Patent
Song et al.

(10) Patent No.: US 12,026,764 B2
(45) Date of Patent: Jul. 2, 2024

(54) METHOD AND APPARATUS FOR PROVIDING INFORMATION USING TRAINED MODEL BASED ON MACHINE LEARNING

(71) Applicant: EMRO CO., LTD., Seoul (KR)

(72) Inventors: Jae Min Song, Seoul (KR); Kwang Seob Kim, Seoul (KR); Ho Jin Hwang, Seoul (KR); Jong Hwi Park, Gyeonggi-do (KR)

(73) Assignee: EMRO Co., Ltd., Seoul (KR)

( * ) Notice: Subject to any disclaimer, the term of this patent is extended or adjusted under 35 U.S.C. 154(b) by 249 days.

(21) Appl. No.: 17/456,147

(22) Filed: Nov. 22, 2021

(65) Prior Publication Data
US 2022/0164850 A1 May 26, 2022

(30) Foreign Application Priority Data

Nov. 23, 2020 (KR) ........................ 10-2020-0158143

(51) Int. Cl.
G06F 16/00 (2019.01)
G06F 16/35 (2019.01)
G06F 40/284 (2020.01)
G06Q 30/0601 (2023.01)

(52) U.S. Cl.
CPC ......... *G06Q 30/0627* (2013.01); *G06F 16/35* (2019.01); *G06F 40/284* (2020.01)

(58) Field of Classification Search
CPC ........... G06Q 30/0627; G06Q 10/0637; G06Q 10/087; G06Q 10/10; G06F 16/35; G06F 40/284; G06F 40/117; G06N 3/045; G06N 3/082; G06N 3/08; G06N 20/00
See application file for complete search history.

(56) References Cited

U.S. PATENT DOCUMENTS

| 8,285,721 | B2 * | 10/2012 | Ruvini | ................... | G06Q 30/08 |
| | | | | | 705/26.7 |
| 10,949,907 | B1 * | 3/2021 | Jain | .......................... | G06N 3/08 |
| 11,367,116 | B1 * | 6/2022 | Verma | ................ | G06Q 30/0629 |
| 2008/0167974 | A1 | 7/2008 | Lee et al. | | |

(Continued)

FOREIGN PATENT DOCUMENTS

| JP | 2009-026195 A | 2/2009 |
| JP | 2012-088803 A | 5/2012 |

(Continued)

Primary Examiner — Debbie M Le
(74) Attorney, Agent, or Firm — Knobbe, Martens, Olson & Bear, LLP

(57) ABSTRACT

Provided is a method of providing information using a trained model through machine learning, which may include checking a first set of character strings including a plurality of character strings representing pieces of information about a plurality of items related to a trained model creation, creating at least one trained model on the basis of the first set of character strings, checking a second set of character strings including a plurality of character strings representing pieces of information about a plurality of items related to an information classification object, and checking reference product name information and attribute information for each of at least a portion of the second set of character strings using the at least one trained model.

12 Claims, 11 Drawing Sheets

(56) References Cited

U.S. PATENT DOCUMENTS

| | | | | |
|---|---|---|---|---|
| 2021/0303726 A1* | 9/2021 | Hayman | ................. | G06N 3/044 |
| 2021/0374825 A1* | 12/2021 | Periyathambi | ..... | G06Q 30/0631 |
| 2022/0044298 A1* | 2/2022 | Oshinaike | .............. | G06V 20/52 |
| 2022/0114821 A1* | 4/2022 | Arroyo | .................. | G06V 20/62 |

FOREIGN PATENT DOCUMENTS

| | | | |
|---|---|---|---|
| JP | 2017-182663 | A | 10/2017 |
| JP | 2019-164402 | A | 9/2019 |
| JP | 2020-113035 | A | 7/2020 |
| JP | 2020-140673 | A | 9/2020 |
| KR | 10-1939106 | B1 | 1/2019 |
| KR | 10-2019-0063978 | A | 6/2019 |
| KR | 10-2019-0080234 | A | 7/2019 |
| KR | 10-2015218 | B1 | 10/2019 |
| KR | 10-2020-0083111 | A | 7/2020 |
| KR | 10-2020-0088088 | A | 7/2020 |

* cited by examiner

| Information about item |
|---|
| TV/4K/U/151.5W/64/flat/OLED/KN |
| LG/phone/and/162/3000mAh/64/Snap845 |

~210

(b)

| Item name | Smart Phone |
|---|---|
| Manufacturer | LG |
| OS | Android |
| Battery(mAh) | 3000 |
| Storage capacity(GB) | 64 |
| AP | Snap845 |
| Weight (g) | 162 |

FIG. 8

| | Training name | Model |
|---|---|---|
| 1 | (1) Attribute classification training (attribute standardization his | Attribute |
| 2 | (1) Word modification BIO training (attribute standardization h | Sequen |
| 3 | (1) Standard product name, sub-category classification training (| Text |
| 4 | (2) Similar items training (attribute standardization history only | Text |
| 5 | (1) Similar items training (attribute standardization history only, | Text |

810

Training | Training result
information

| Training name | (1) Standard product name, sub-category classification training (attribute stand |
|---|---|
| Model type | Text classification |
| Target data | Selection |
| Pre-processing list | Data does not exist. |
| Post-processing list | Data does not exist. |
| Training description | |

820

| Training parameters | |
|---|---|
| Embedding Model | Character Embedding |
| epoch | 200 |
| Max word length | 300 |
| Max number of words | 1 |
| Number of Top K | 1 |
| Embedding size | 30 |
| CNN filters number | 2,3,4,5,7 |
| CNN filters output | 64 |
| CNN dropout | 0.2 |
| FCN hidden units | 1024 |
| Batch size | 1024 |
| learning rate | 0.00008 |
| Validate Y/N | ☐ |
| Train data ratio | 0.9 |
| Validation start epoch | -1 |

| Character string | Modified character string | Reference product name information |
|---|---|---|
| #1 CW BIO-DISPERSANTFOR | # 1 CW BIO-DISPERSANT | BIO-DISPERSANT |

FIG. 10

| Character string | | Attribute information | |
|---|---|---|---|
| Attribute name | Attribute value | Attribute name | Attribute value |
| SIZE | Q:10M3/HR HEAD:20M 3.7KW | | |
| | | FLOW RATE | 10M3/H |
| | | PUMPING HEAD | 20M |
| | | POWER | 3.7KW |

METHOD AND APPARATUS FOR PROVIDING INFORMATION USING TRAINED MODEL BASED ON MACHINE LEARNING

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

This application claims the benefit of Korean Patent Application No. 10-2020-0158143, filed on Nov. 23, 2020, in the Korean Intellectual Property Office, the disclosure of which is incorporated herein by reference.

BACKGROUND

Technical Field

The present disclosure relates to a method and apparatus for providing information using a trained model created based on machine learning.

Description of the Related Technology

Natural language processing (NLP) is one of the main fields of artificial intelligence in which research is performed to enable machines such as computers to imitate human language phenomena. With the development of machine learning and deep learning techniques in recent years, language processing research and development have been actively conducted to extract and utilize meaningful information from huge amounts of text through machine learning and deep learning-based natural language processing.

In relation to this, a document in the related art includes: Korean Patent Publication No. 10-1939106.

The document in the related art discloses an inventory management system and inventory management method using a training system. As such, companies need to standardize, integrate, and manage various types of pieces of information produced by the companies to improve work efficiency and productivity. For example, when items purchased by the companies are not systematically managed, duplicate purchases may occur and it may be difficult to search for an existing purchase history. The document in the related art discloses technical features of creating a predictive model and performing inventory management based on the predictive model, but does not disclose a specific prediction model creation method or an item classification method specialized for inventory management.

In general, there are many cases in which pieces of item information in a form of raw text are used in companies. In the case of raw text, there is no separate classification for items, and the raw text does not have a uniform writing format and has a random composition according to the text creator's tendency in many cases. Thus, it is somewhat difficult to accurately identify information about an item that the raw text means. Accordingly, there is a need for a method of effectively identifying information about an item with greater accuracy and providing the information about the item.

SUMMARY

An aspect provides a method and apparatus for creating a trained model on the basis of a character string representing information about an item, and effectively checking the character string representing the information about the item with greater accuracy using the created trained model.

Another aspect also provides a method and apparatus for creating a trained model for more effectively checking a character string representing information about an item.

The technical object to be achieved by the present example embodiments is not limited to the above-described technical objects, and other technical objects which are not described herein may be inferred from the following example embodiments.

According to an aspect, there is provided a method of providing information using a trained model through machine learning, including checking a first set of character strings including a plurality of character strings representing pieces of information about a plurality of items related to a trained model creation, creating at least one trained model on the basis of the first set of character strings, checking a second set of character strings including a plurality of character strings representing pieces of information about a plurality of items related to an information classification object, and checking reference product name information and attribute information for each of at least a portion of the second set of character strings using the at least one trained model.

According to another aspect, there is provide an apparatus for providing information using a trained model through machine learning, including a memory including at least one instruction, and a processor, and, on the basis of the at least one instruction, the processor is configured to check a first set of character strings including a plurality of character strings representing pieces of information about a plurality of items related to a trained model creation, create at least one trained model on the basis of the first set of character strings, check a second set of character strings including a plurality of character strings representing pieces of information about a plurality of items related to an information classification object, and check reference product name information and attribute information for each of at least a portion of the second set of character strings using the at least one trained model.

According to still another aspect, there is provided a computer-readable non-transitory recording medium recording a program for executing a method of providing information using a trained model through machine learning on a computer, and the method of providing information includes checking a first set of character strings including a plurality of character strings representing pieces of information about a plurality of items related to a trained model creation, creating at least one trained model on the basis of the first set of character strings, checking a second set of character strings including a plurality of character strings representing pieces of information about a plurality of items related to an information classification object, and checking reference product name information and attribute information for each of at least a portion of the second set of character strings using the at least one trained model.

Specific details of other example embodiments are included in the detailed description and drawings.

In a method and apparatus for providing information according to the present disclosure, a reference product name and attribute information corresponding to an item can be checked more accurately and effectively by analyzing a character string representing information about the item using a trained model that is created using the character string.

Further, in a method and apparatus for providing information according to the present disclosure, a character string representing information about an item can be analyzed quickly and efficiently by using a trained model to allow the information about the item corresponding to the character string to be automatically provided by just inputting the character string.

It should be noted that effects of the present disclosure are not limited to the above-described effects, and other effects that are not described herein will be clearly understood by those skilled in the art from the description of the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 2 is a diagram for describing a method for managing information about an item according to an example embodiment of the present disclosure;

FIG. 8 is a diagram for describing parameters of a trained model used in the information providing apparatus according to an example embodiment of the present disclosure;

FIG. 9 is a diagram for describing a case in which reference product name information is checked by the information providing apparatus according to an example embodiment of the present disclosure;

FIG. 10 is a diagram for describing a case in which the attribute information is checked by the information providing apparatus according to an example embodiment of the present disclosure.

DETAILED DESCRIPTION

Terms used in example embodiments are general terms that are currently widely used while their respective functions in the present disclosure are taken into consideration. However, the terms may be changed depending on the intention of one of ordinary skilled in the art, legal precedents, emergence of new technologies, and the like. Further, in certain cases, there may be terms arbitrarily selected by the applicant, and in this case, the meaning of the term will be described in detail in the corresponding description. Accordingly, the terms used herein should be defined based on the meaning of the term and the contents throughout the present disclosure, instead of the simple name of the term.

Throughout the specification, when a part is referred to as including a component, unless particularly defined otherwise, it means that the part does not exclude other components and may further include other components.

The expression "at least one of a, b, and c," should be understood as including only a, only b, only c, both a and b, both a and c, both b and c, or all of a, b, and c.

Example embodiments of the present disclosure that are easily carried out by those skilled in the art will be described in detail below with reference to the accompanying drawings. The present disclosure may, however, be implemented in many different forms and should not be construed as being limited to the example embodiments described herein.

Example embodiments of the present disclosure will be described in detail below with reference to the drawings.

Figure 1:
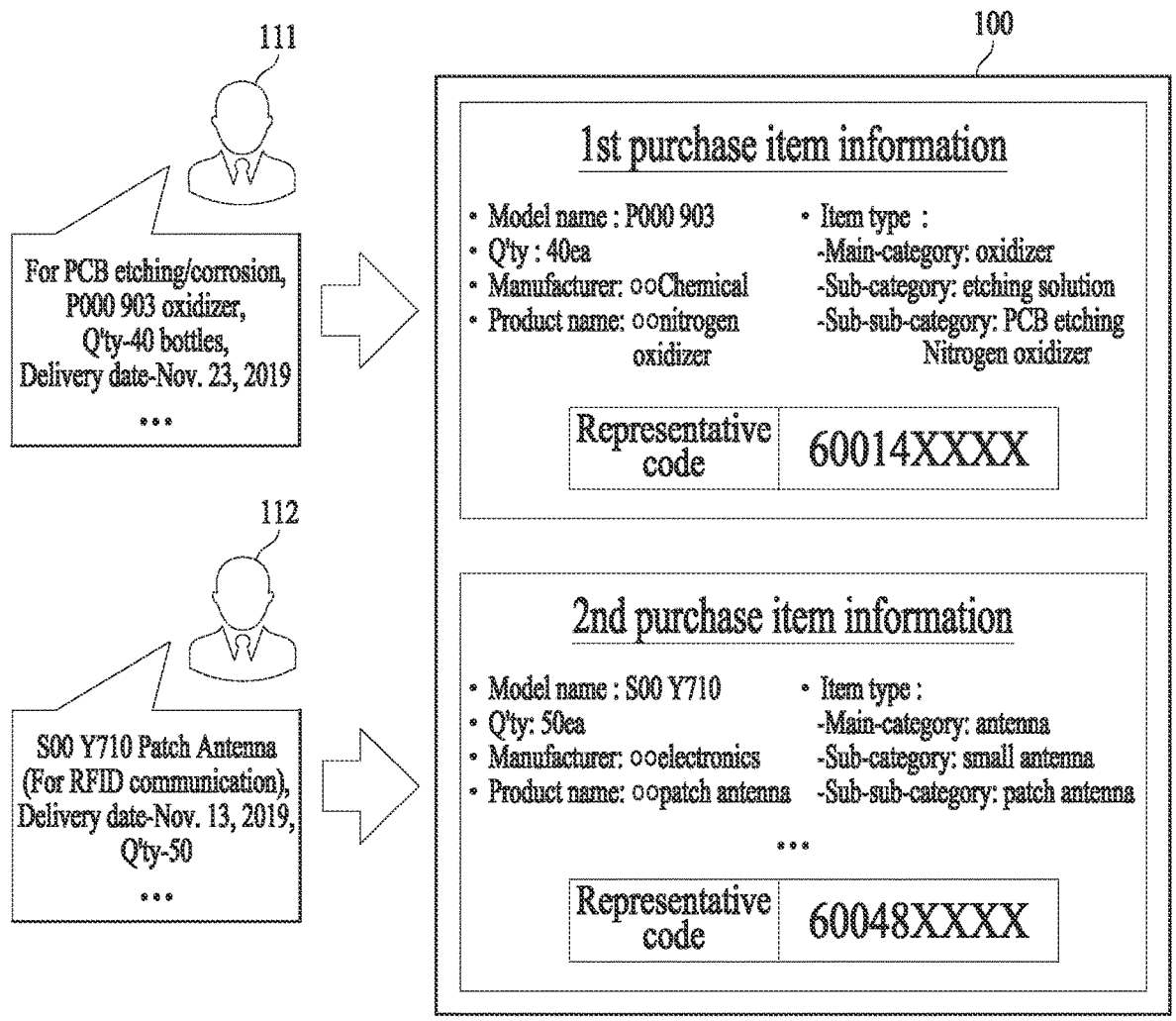
FIG. 1 is a diagram for describing an item management system according to an example embodiment of the present disclosure.

FIG. 1 is a diagram for describing an item management system according to an example embodiment of the present disclosure.

When pieces of information about items are received, an item management system 100 according to an example embodiment of the present disclosure, may process information about each item in a unified format and assign codes to the items to which a separate code is not assigned, and the code that is initially assigned to a specific item may be a representative code. In an example embodiment, the item information may include a general character string and may be a character string including at least one delimiter. In an example embodiment, the delimiter may include, but is not limited thereto, a space character and punctuation marks and may include a character capable of distinguishing between specific items.

Referring to FIG. 1, the item management system 100 may receive pieces of purchase item information from a plurality of managers 111 and 112. In the example embodiment, the purchase item information may be a purchase request for purchasing the corresponding item, and in this case, the pieces of purchase item information received from the plurality of managers 111 and 112 may be different in format, and thus there may be a difficulty in integrating and managing a plurality of purchase requests.

Accordingly, the item management system 100, according to an example embodiment, may perform machine learning on the basis of existing item information, process the pieces of purchase item information received from the plurality of managers 111 and 112 in a predetermined format according to learning results created through the machine learning, and store the processed item information.

For example, the item information provided by a first manager 111 may include only a specific model name (e.g., "P000_903") and a use (for printed circuit board (PCB) etching/corrosion) of the item, but may not include information required for classifying the item (e.g., information about a main-category, a sub-category, and a sub-sub-category). In this case, when the item information provided by the first manager 111 is received, the item management system 100 may classify the item and attribute information of the item on the basis of a result of the machine learning, and may store and output a classification result.

Further, even when the order of all attribute items included in the item information provided by the first manager 111 is different from the order of all attribute items included in the item information provided by a second manager 112, the item management system 100 may classify and store the attribute information by checking each of the attribute items. Meanwhile, in an example embodiment, the first manager 111 and the second manager 112 may be the same manager. Further, even when pieces of information about the same item are recorded differently due to a misspelling or a display form, by determining a similarity between the pieces of input item information according to the training result of the trained model, an operation such as determining the similarity between the received item and the already input item or assigning a new representative code to the received item may be performed.

Accordingly, in the item management system 100 according to an example embodiment, the efficiency of managing information about each item may be increased.

Meanwhile, in FIG. 1, the description is provided on the assumption that the item management system 100 is for the purpose of integrally managing information related to an item purchase, but the use of the item management system 100 is not limited to the item purchase, and the item management system 100 may also be used for reclassifying the corresponding information based on the already input item information. Thus, it is clear for those skilled in the art that the example embodiment of the present specification may be applied to all systems for integrating and managing a plurality of items. In other words, it is clear that the example embodiment of the present specification may be utilized in processing previously-stored item information as well as in requesting a purchase of an item.

FIG. 2 is a diagram for describing a method for managing information about an item according to an example embodiment of the present disclosure.

When information about an item is received, the item management system according to an example embodiment may classify pieces of attribute information in the received information on the basis of each attribute item. The information about the item may include a plurality of pieces of attribute information, and the pieces of attribute information may be classified according to the attribute item. More specifically, the information about the item may be a character string including a plurality of pieces of attribute information, and the item management system may classify the information about the item to derive information corresponding to each attribute.

Referring to FIG. 2, the item management system may receive pieces of information about a plurality of items, which have different formats. For example, the item management system may perform crawling or receive the pieces of information about the plurality of items from a customer database, or may receive the pieces of information about the plurality of items through a user's input. Further, the attribute items (an item name, a manufacturer, an operating system (OS), and the like) included in the pieces of information about the item may not be identified.

In this case, the item management system according to an example embodiment may classify each attribute information included in the information about the item through machine learning. For example, pieces of item information 210 shown in FIG. 2 may be classified into pieces of attribute information according to various attribute items including an item name. In the example embodiment, the management system may determine which attribute corresponds to each piece of information classified according to a trained model, check the item to which the character string for one item corresponds based on a value corresponding to each attribute, and check information about the item of the same category, thereby collectively managing such items.

According to the item management system, pieces of information corresponding to all attributes may be derived from the information about the item and divided and stored, and even when a character string corresponding to the pieces of information is input later, the corresponding character string may be analyzed to check the corresponding attribute value, classified, and stored.

Thus, the item management system according to an example embodiment may standardize pieces of information about items, manage main attribute information, and thus may classify the items that are similar or overlapping, thereby increasing the convenience of data maintenance.

Figure 3:
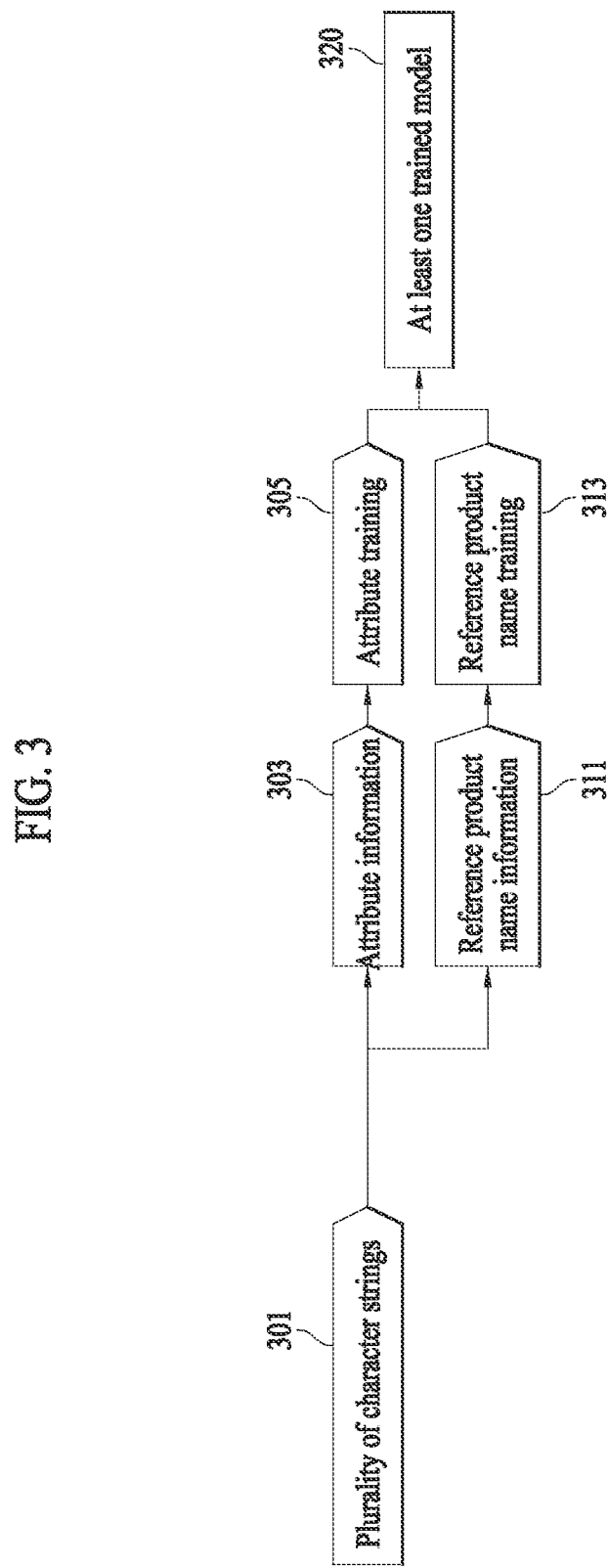
FIG. 3 is a diagram for describing a method of creating a trained model according to an example embodiment of the present disclosure.

FIG. 3 is a diagram for describing a method of creating a trained model according to an example embodiment of the present disclosure.

Referring to FIG. 3, a computing device may perform training using a plurality of character strings 301 related to item information to generate at least one trained model 320. For example, the computing device may check attribute information 303 related to the item from the character string related to the item information and perform attribute training 305 on the basis of the attribute information 303, and accordingly, create a first trained model. In addition, the computing device may check reference product name information 311 related to the item from the character string related to the item information and perform reference product name training 313 on the basis of the reference product name information 311, and accordingly, create a second trained model.

The plurality of character strings 301 related to the item information may represent pieces of information about a plurality of items related to the trained model creation. The plurality of character strings 301 may be included in a source character string set, and in this case, the source character string set may be a set of character strings representing various pieces of information about items to be analyzed. That is, the plurality of character strings 301 used for training may be some of various character strings included in the source character string set.

In one embodiment, the character string is a combination of characters representing information about an item, and for example, the character string may be the same as the item information 210 shown in FIG. 2A. There may be corresponding attribute information (e.g., a manufacturer, an operating system (OS), a battery, a size) and reference product name information (e.g., an item name) for each of the plurality of character strings 301. The attribute information and the reference product name information are values that are previously designated according to the item, and may also be previously designated in the character string representing the item information in the same manner as the item.

In an example embodiment, for the same item, a product name referring to the same item may be different depending on the manufacturer of the item. For example, a switch of a manufacturer A may be referred to as "K" and a switch of a manufacturer B may be referred to as "M." According to an example embodiment of the present disclosure, by classifying both the product names, which are referred to as "K" and "M," as a reference product name of "R," the items may be managed more effectively. In addition, similarly, even when the same attribute is referred to as another term, according to an example embodiment of the present disclosure, the same attribute may be analyzed, and information about the analysis result may be provided so that the items may be more effectively managed.

In an example embodiment, at least some of types of the pieces of attribute information may be different according to the reference product name. For example, when the reference product name is "BIO-DISPERSANT," the types of the attribute information may include "FLOW RATE," "PUMPING HEAD," "POWER," and "SIZE." When the reference product name is "SMART PHONE," the types of the attribute information may include "OS," "POWER," and "SIZE."

Each of the attribute information and the reference product name information may be used as a correct answer value of the trained model, and accordingly, a trained model for the attribute information and a trained model for the reference product name information may be created.

In an example embodiment, a first trained model may be created by performing the training 305 on the attribute information using the plurality of character strings 301 as input values, and using the attribute information 303 corresponding to each of the plurality of character strings 301 as a correct answer value. For example, when a first character string is input, training may be performed using attribute information representing the first character string as a correct answer value, and thereafter, when a second character string is input, training may be performed using attribute information representing the second character string as a correct answer value. As such, since the training of the first trained model is performed on the basis of the plurality of character strings 301 and the attribute information, when a character string is input, the first trained model may check attribute information corresponding to the input character string.

For another example, a second trained model may be created by performing the training 313 on the reference product name information using the plurality of character strings 301 as input values and the reference product name information 311 as a correct answer value. For example, when a first character string is input, training may performed using reference product name information representing the first character string as a correct answer value, and thereafter, when a second character string is input, training may be performed using reference product name information representing the second character string as a correct answer value. As such, since the training of the second trained model is performed on the basis of the plurality of character strings 301 and the attribute information, when a character string is input, the first trained model may check reference product name information corresponding to the input character string.

In an example embodiment, since the types of the attribute information may be different according to the reference product name information, the training using the attribute information and the training using the reference product name information may be performed in association with each other. For example, the training using the attribute information may be performed by being distinguished according to the reference product name. In this case, the at least one trained model 320 may include a trained model for checking the reference product name and at least one trained model for checking the attribute information for each reference product name. For example, the at least one trained model 320 may include a first trained model trained to check a reference product name corresponding to a character string, a second trained model trained to check attribute information according to the type of attribute information corresponding to a first reference product name, and a third trained model trained to check attribute information according to the type of attribute information corresponding to a second reference product name.

In an example embodiment, the second trained model and the third trained model may be implemented as one trained model. For example, when the second trained model and the third trained model are implemented as one fourth trained model, when a character string and reference product name information are input, the fourth trained model may check attribute information corresponding to the character string.

Here, the present disclosure is not limited thereto, and in some cases, the at least one trained model 320 may include a trained model trained to check the attribute information even when only the character string is input regardless of whether the reference product name is designated.

The at least one trained model 320 may include the first trained model and the second trained model described above. Each of the at least one trained model 320 may be composed of a convolutional neural network (CNN), but the present disclosure is not limited thereto.

Figure 4:
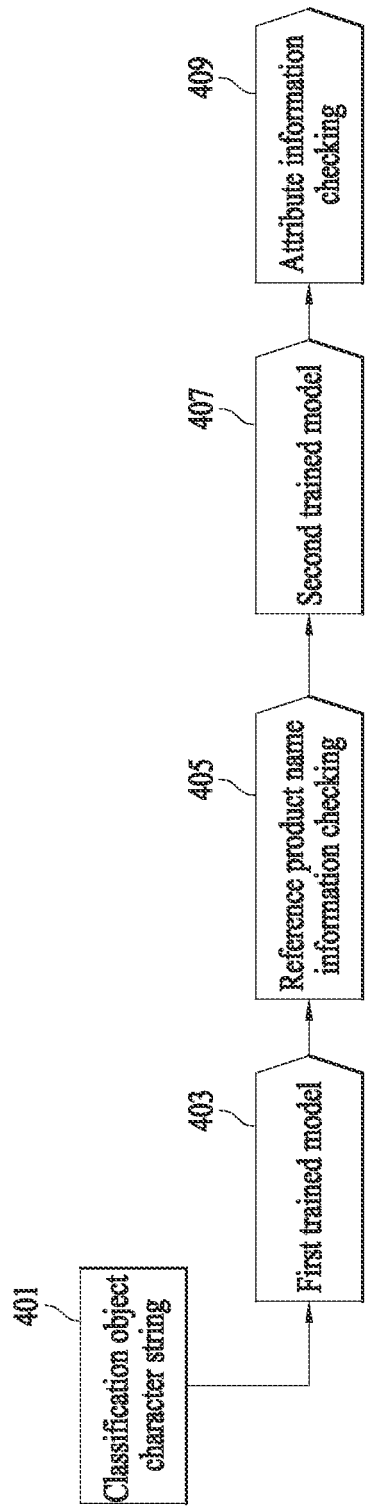
FIG. 4 is a diagram for describing a method of checking a character string using a trained model according to an example embodiment of the present disclosure.

FIG. 4 is a diagram for describing a method of checking a character string using a trained model according to an example embodiment of the present disclosure.

Referring to FIG. 4, a classification object character string 401, which is a character string to be classified, may be input to a first trained model 403. The first trained model 403 may perform checking 405 of the reference product name information representing the classification object character string 401.

The classification object character string in which reference product name information is checked may be input to a second trained model 407. The second trained model 407 may perform attribute information checking 409 for the classification object character string in which the reference product name is checked.

Although not shown in the drawing, according to an example embodiment, attribute tokenization may be performed on the classification object character string in which reference product name information is checked. The attribute tokenization may refer to an operation of classifying a character string into units of words constituting the character string. Specifically, for example, when a character string is [GLOBE VALVE, SIZE 1½," A-105, SCR'D, 800 #, JIS], the character string may be tokenized in units of words as [GLOBE VALVE, SIZE 1½," A-105.SCR'D, 800 #, JIS]. Such tokenization in units of words may be performed on the basis of at least one of a space character and punctuation marks. The tokenized word may be a word having a particular meaning, but the present disclosure is not limited thereto.

In an example embodiment, when the character string is tokenized, at least one token may be generated. A tag is added to the at least one token by a trained model in which machine learning is performed. The addition of the tag may be performed on the basis of a trained model for adding tags, which is prepared on the basis of machine learning. One or more tokens may be determined as a word on the basis of the tag. The determined word may be input to the second trained model 407. The second trained model 407 may check attribute information corresponding to the input word. Meanwhile, a more detailed description related to the tokenization and tag addition may refer to FIG. 11.

Figure 5:
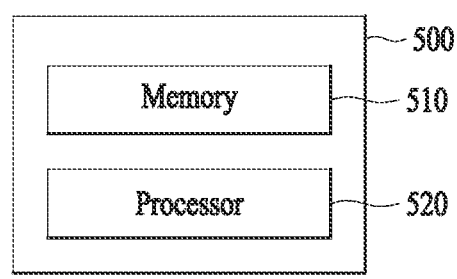
FIG. 5 is a functional block diagram of an information providing apparatus according to an example embodiment of the present disclosure.

FIG. 5 is a functional block diagram of an information providing apparatus according to an example embodiment of the present disclosure. Constituent elements related to the present example embodiment are shown in FIG. 5, but the present disclosure is not limited thereto, and other general constituent elements may be further included in addition to the constituent elements shown in FIG. 5.

Referring to FIG. 5, an information providing apparatus 500 using a trained model through machine learning may include a memory 510 and a processor 520. Meanwhile, the information providing apparatus 500 may take the form of a computing device. Each element shown in FIG. 5 refers to a unit that processes at least one function or operation, and may be implemented as hardware, software, or a combination of hardware and software.

The memory 510 may store various pieces of data related to the information providing apparatus 500. For example, the memory 510 may store at least one instruction for the operation of the information providing apparatus 500. In this case, the processor 520 may perform various operations based on the instruction stored in the memory 510.

The processor 520 may control the overall operation of the information providing apparatus 500. For example, the processor 520 may control the operation of the information providing apparatus 500 by controlling the elements of the information providing apparatus 500 on the basis of the instruction stored in the memory 510.

The processor 520 may check a first set of character strings including a plurality of character strings representing pieces of information about a plurality of items related to a trained model creation. Each of the plurality of character strings may represent each of the pieces of information about the items distinguished from each other. Each of the plurality of character strings may be composed of one or more words, and in some cases, the arrangement or attribute information of the words constituting the character string may be irregular. For example, different words may represent the same meaning, or the arrangement of the words constituting the character string may be different for each character string.

Here, the word may include a combination (or a group or a set) of characters that may be separated and written independently, but are not limited to, and may include a combination of characters that may be divided using, for example, a space character or a punctuation mark. In addition, the word may have a particular meaning, but the present disclosure is not limited thereto.

The processor 520 may create at least one trained model on the basis of the first set of character strings. The processor 520 may create the at least one trained model using the first set of character strings as training data.

In an example embodiment, the processor 520 may train the trained model using the first set of character strings and reference product name information that represent each character string of the first set of character strings. In this case, when a specific character string is input, a trained model for checking reference product name information representing the input character string may be created.

In an example embodiment, the processor 520 may train the trained model using the first set of character strings and attribute information corresponding to each character string of the first set of character strings. In this case, when a specific character string is input, a trained model for checking attribute information representing the input character string may be created.

In some cases, the attribute information may be different in type according to the reference product name. In this case, the training may be performed on the basis of the fact that the reference product name is designated. For example, the training may be performed using character strings having a first reference product name and attribute information corresponding to each of the character strings. Thereafter, the training may be performed using the character strings having the first reference product name and the attribute information corresponding to each of the character strings. For another example, as a character string and a reference product name corresponding to the character string may be input, and attribute information is input as a correct answer value, and accordingly, the training may be performed. However, the present disclosure is not limited thereto, and even when the reference product name is not distinguished, the training may be performed to output the corresponding attribute information only when the character string is input.

In an example embodiment, at least one trained model may perform training on the basis of supervised training. The at least one trained model may be created on the basis of the first set of character strings and the product name information and the attribute information for the first set of character strings. For example, in the at least one trained model, training may be performed on the basis of the supervised training using the first set of character strings as input values, and using the reference product name information and the attribute information as correct answer values. For another example, the at least one trained model may include a first trained model and a second trained model, and training may be performed on the basis of supervised training using a reference product name as a correct answer value in the case of the first trained model, and training may be performed on the basis of supervised training using an attribute as a correct answer value for the second trained model. The correct answer value (e.g., a reference product name, and an attribute), which is used as training data, corresponding to each character string may be previously designated.

The processor 520 may check a second set of character strings including a plurality of character strings representing pieces of information about a plurality of items related to information classification objects. The second set of character strings may be related to a plurality of items that are the information classification objects.

Meanwhile, the first set of character strings and the second set of character strings may be included in a source character string set. The source character string set may be a group that includes character strings representing each of the one or more items. Among the source character string set, the first set of character strings may be selected as character strings for training, and the second set of character strings may be selected as character strings to be analyzed using the trained model.

According to an example embodiment, at least a portion of the first set of character strings may be duplicated with at least a portion of the second set of character strings, and the data used for training may be used in verification of the training. However, this is merely an example, and the present example embodiment is not limited to such an example.

In an example embodiment, the character strings included in the source character string set may be categorized. That is, the character strings included in the source character string set may be categorized on the basis of a similarity between the character strings, and may be classified into category units. For example, a first character string and a second character string may be included in a first category and a third character string and a fourth character string may be included in a second category. The first character string and the second character string included in the first category may be similar to each other and the third character string and the fourth character string included in the second category may be similar to each other.

The similarity used for the categorization of the character strings may be determined by various criteria. For example, the similarity may be determined on the basis of attribute information related to the character string. In this case, the character string included in the source character string set may have category information corresponding to the attribute information.

In an example embodiment, the first set of character strings may be selected from the source character string set on the basis of the category information. For example, the first set of character strings may be selected to include the character strings of a reference ratio (e.g., 20%) or more of the character strings, which have the same category, from the source character string set on the basis of the category information. The first set of character strings may be generated to include the character strings as many as corresponding to a specific ratio or more for each category constituting the source character string set. For example, when ten character strings are included in the first category and 20 character strings are included in the second category, and the reference ratio is 20%, the first set of character strings may include two character strings among the character strings of the first category and four character strings among the character strings of the second category. Here, the character strings selected for each category may be randomly selected, but the present disclosure is not limited thereto.

In an example embodiment, the reference ratio for selecting character strings to be included in the first set of character strings may be determined on the basis of at least one among types of the plurality of items, a length of the plurality of character strings, and the number of the categories. The types of the plurality of items may include, for example, a type of a reference product name that may represent the plurality of items. The length of the plurality of character strings may include, for example, an average length of each of the plurality of character strings. The number of the categories may include, for example, the number of the categories that constitute the source character string set.

For example, the reference ratio may be determined in proportion to a value represented by at least one among the types of the plurality of items, the length of the plurality of character strings, and the number of the categories. For another example, the reference ratio may be determined to be a greater value when the number of the types of the plurality of items is greater than or equal to a predetermined number, when the length of the character string is greater than or equal to a predetermined length, and when the number of the categories is greater than or equal to a predetermined number. However, the present disclosure is not limited thereto, and the reference ratio may be a predetermined value.

The processor 520 may use at least one trained model to check reference product name information and attribute information for each of the at least a portion of the second set of character strings. The at least one trained model may include a first trained model related to deriving the reference product name information and a second trained model related to deriving the attribute information. In this case, the processor 520 may derive reference product name information on the basis of the second set of character strings through the first trained model. The processor 520 may perform tokenization on at least a portion of each character string of the second set of character strings on the basis of the derived reference product name information. The processor 520 may derive the attribute information on the basis of the tokenized character string through the second trained model.

In an example embodiment, in relation to the tokenization, the processor 520 may perform the tokenization on at least a portion of each character string of the second set of character strings on the basis of a space character included in the second set of character strings. The processor 520 may add a tag to each of a plurality of tokens, which are generated on the basis of the tokenization, through machine learning. A process of adding the tags may be performed on the basis of a trained model previously prepared on the basis of the machine learning.

The processor 520 may determine one or more tokens as a word on the basis of the tags. The tags may include, for example, a start tag, a continuous tag, and an end tag. In this case, the processor 520 may determine, as one word, from a token, to which the start tag is added, to a token before a token, to which the next start tag is added, or from the token, to which the start tag is added, to a token to which the end tag is added. A more specific description related to the tokenization may refer to FIG. 11.

The processor 520 may derive the attribute information on the basis of the word determined using the second trained model. For example, the processor 520 may derive the attribute information corresponding to each word on the basis of inputting the determined word into the second trained model.

In an example embodiment, for the at least one trained model, the training may be performed using one or more parameters. The one or more parameters may include at least one of, for example, the number of training iterations, a text number unit for training, the number of hidden units of a machine learning algorithm, a dimension of an output vector of the machine learning algorithm, a dropout of the output vector, a batch size of the machine learning algorithm, and a learning rate. The processor 520 may control the training of the trained model more effectively by adjusting at least one of the one or more parameters. A more specific description related to the adjustment of the parameters may refer to FIG. 8.

In an example embodiment, the processor 520 may modify the input character string using at least one of the reference product name information and the attribute information on the basis of the checking of the reference product name information and the attribute information. The processor 520 may provide a modified character string. For example, the processor 520 may modify and provide a character string such that the character string includes text representing a reference product name or attribute to make it easier to check the reference product name or attribute by looking at the character string. A specific example related thereto may refer to FIG. 9.

Figure 6:
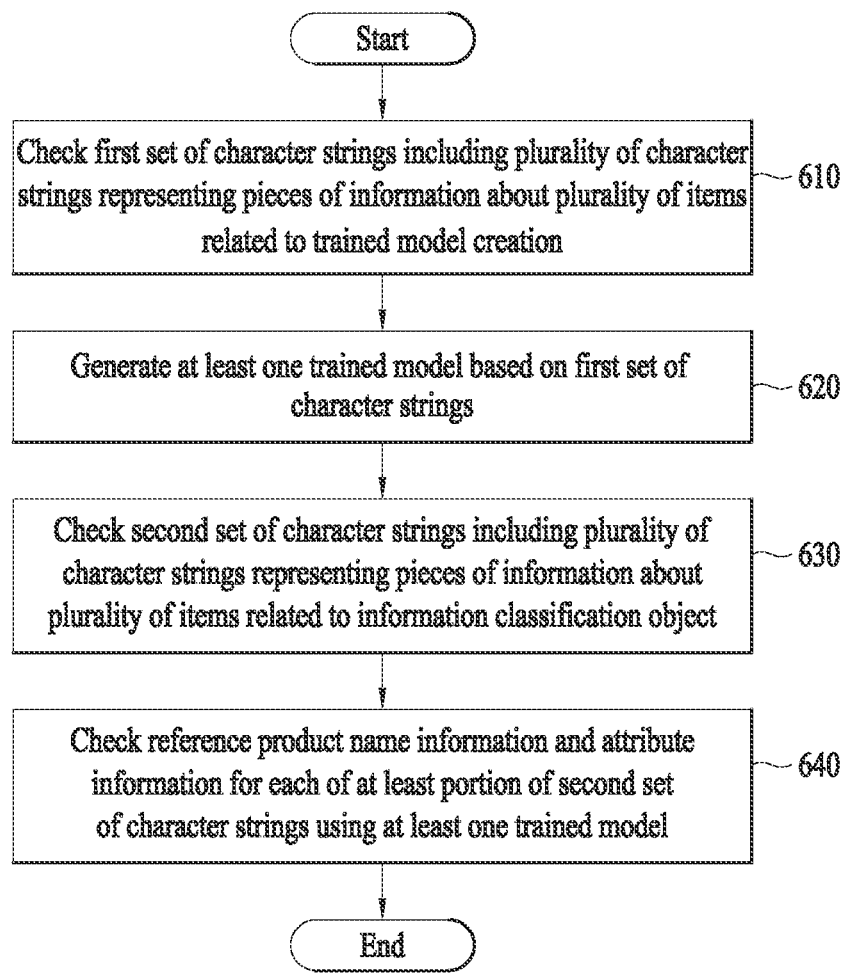
FIG. 6 is a diagram illustrating a flow of each operation of a method of providing information according to an example embodiment of the present disclosure.

FIG. 6 is a diagram illustrating a flow of each operation of a method of providing information according to an example embodiment of the present disclosure. It is to be understood that, in some cases, each operation of the method shown in FIG. 6 may be performed in different order shown in the drawing. In the following description of the drawing, descriptions of contents overlapping the contents described above may be omitted.

Referring to FIG. 6, in operation 610, the information providing apparatus may check a first set of character strings including a plurality of character strings representing pieces of information about a plurality of items related to a trained model creation. The first set of character strings may be at least a part of a source character string set composed of a plurality of character strings. Each of the plurality of character strings may represent the information about the item. The information about the item may include information about at least one of a reference product name and an attribute of the item.

In operation 620, the information providing apparatus may create at least one trained model on the basis of the first set of character strings. The information providing apparatus may create the at least one trained model using the first set of character strings as training data. Specifically, the information providing apparatus may create a trained model that uses the first set of character strings, and reference product name information and attribute information corresponding to each of the character strings, wherein the trained model derives at least one of the reference product name information and the attribute information when a character string is input.

In operation 630, the information providing apparatus may check a second set of character strings including a plurality of character strings representing pieces of information about a plurality of items related to an information classification object. The second set of character strings may be at least a part of the source character string set. The second set of character strings may be related to items to be classified (or analyzed).

In operation 640, the information providing apparatus may use the at least one trained model to check reference product name information and attribute information for each of the at least a portion of the second set of character strings. The information providing apparatus may check the reference product name information and the attribute information corresponding to each character string of the second set of character strings on the basis of inputting the second set of character strings to the at least one trained model created on the basis of the first set of character strings.

In an example embodiment, the at least one trained model may include a first trained model related to deriving the reference product name information and a second trained model related to deriving the attribute information. The information providing apparatus may check the reference product name information representing each character string of the second set of character strings on the basis of the analysis of the second set of character strings through the first trained model. The information providing apparatus may perform tokenization on each character string of the second set of character strings on the basis of the reference product name information. The information providing apparatus may determine a word corresponding to each character string of the second set of character strings on the basis of the tokenization. The information providing apparatus may check attribute information representing a word determined on the basis of analyzing the determined word through the second trained model. As a result, the reference product name information and the attribute information for each character string of the second set of character strings may be checked.

Figure 7:
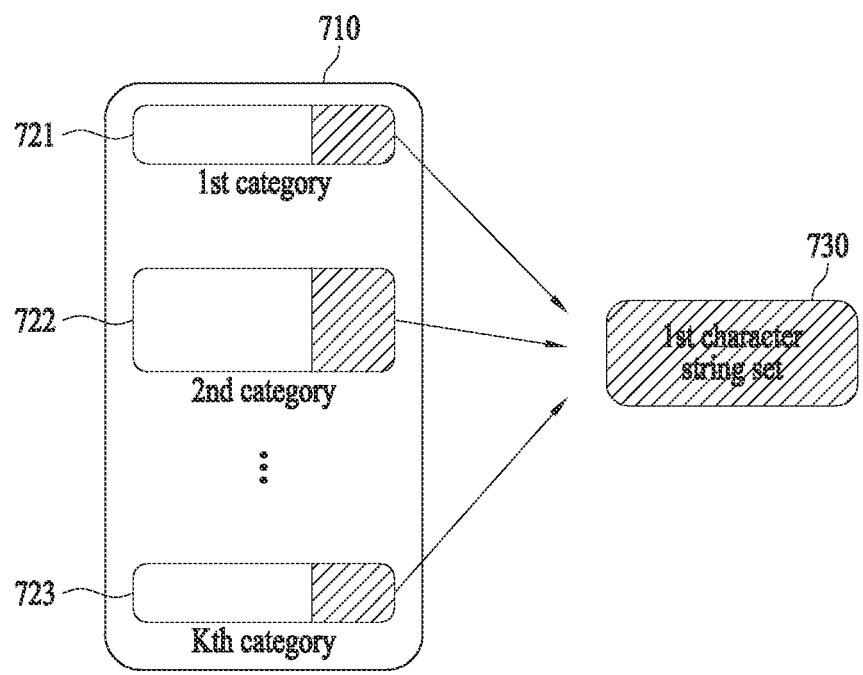
FIG. 7 is a diagram for describing a character string set used for creating at least one trained model in the information providing apparatus according to an example embodiment of the present disclosure.

FIG. 7 is a diagram for describing a character string set used for creating at least one trained model by the information providing apparatus according to an example embodiment of the present disclosure.

Specifically, FIG. 7 conceptually illustrates an example embodiment in which, when a source character string set 710 is divided into a plurality of categories, for each category, some of character strings greater than or equal to a reference ratio are selected and included in a first character string set 730.

Referring to FIG. 7, the source character string set 710 may include a plurality of categories, for example, a first category 721, a second category 722, and a kth category 723. Each of the plurality of categories may include one or more character strings (not shown). In this case, the first character string set 730 may be provided on the basis of selecting some of the character strings, which are greater than or equal to the reference ratio, for each category.

For example, when the reference ratio is 20%, the character strings as many as corresponding to 20% of the number of the character strings included in the first category 721 may be selected and included in the first character string set 730. Similar to the case of the first category 721, the character strings as many as corresponding to 20% of the number of the character strings included in each of the categories from the second category 722 to the kth category 723 may be selected and included in the first character string set 730.

Meanwhile, in an example embodiment, the categories may be classified on the basis of attribute information, and in this case, the first character string set 730 may include a character string having various pieces of attribute information because the first character string set 730 is configured on the basis of the category information. When a trained model is created using the first character string set 730, the created trained model may classify the various pieces of attribute information.

The present disclosure is not limited thereto, and the categories may be divided on the basis of a similarity between the character strings. For example, the categories may be generated on the basis of a trained model (hereinafter, a third trained model) that makes similar pieces of data into a category. In this case, the plurality of categories may be generated by categorizing similar character strings on the basis of inputting the character strings included in the source character string set into the third trained model. The third trained model may be implemented as various types of trained models based on non-supervised training (e.g., a generative adversarial network (GAN)).

FIG. 8 is a diagram for describing parameters of a trained model used in the information providing apparatus according to an example embodiment of the present disclosure.

The information providing apparatus according to an example embodiment may generate a trained model on the basis of a plurality of character strings in performing machine learning using the character strings, classify information about the character strings using the created trained model, and provide the classified information. In classifying the information about the character strings, the information providing apparatus may improve the performance of the trained model by adjusting parameters. FIG. 8 is a diagram for describing a case of adjusting the parameters to improve the performance of the trained model.

Referring to FIG. 8, the information providing apparatus may provide a list 810 for trained models used for providing information. The list 810 may include a list for a first trained model and a second trained model, but the present disclosure is not limited thereto, and the list 810 may include a list of trained models used for tokenization or a list of trained models used for categorization of a source character string set.

Referring to FIG. 8, one of the trained models included in the list 810 may be selected on the basis of a user input. In this case, detailed information 820 for the selected trained model may be provided. Hereinafter, the selected trained model is assumed to be a first trained model among one or more trained models in which training is performed using the first character string set.

In an example embodiment, on the basis of selecting the first trained model, in the detailed information 820, a name designated to refer to the first trained model may be displayed in a field of "Training name." A type of the first trained model may be displayed in a field of "Model type." The detailed information 820 is exemplary, and thus the present disclosure is not limited thereto, and various pieces of information related to the first trained model, for example, a created date may be displayed.

In an example embodiment, parameter information 830 related to the first trained model may be displayed on the basis of selecting the first trained model. The parameter information 830 may be adjusted according to design requirements of the information providing apparatus or the item management system as adjusting elements for adjusting the performance of the first trained model. A more detailed description of the parameters shown in FIG. 8 may refer to Table 1 below.

TABLE 1

| Main parameter name | Description |
|---|---|
| Embedding Model | Parameter for determining embedding unit (e.g., character embedding or word embedding) |
| Epoch | Number of training iterations, increased when number of data and number of correct answer values increase |
| Max word length | Maximum length of input character string |
| Max number of words | Value used in word embedding, maximum number of input strings Fixed to one in character embedding |
| Embedding size | Dimension of vector for one character, value indicating which dimension of vector is used for inputting single character |
| CNN filters numbers | Number of characters (n-gram) in text to be analyzed, when it is two, input text is analyzed in two-character units |
| CNN filter output | Number of dimensions of vector in which features extracted from filter of trained model is to be expressed, when filter numbers are 2, 3, 4, 5, and 7 and output is 64, 5 × 64 dimensions becomes feature vector of input text |
| CNN dropout | Ratio that should be removed from CNN output vector to avoid overfitting |
| FCN hidden units | Number of hidden units in fully connection network based learning |
| Batch size | Number of data processed in parallel during learning |
| Learning rate | Value used in optimization, as number of correct answer values increase and difference between training data decreases, learning rate value is reduced |

The parameters that may be adjusted to improve the performance of the trained model are not limited to FIG. 8 or Table 1, and it is clear for those skilled in the art that the parameters may be changed according to system design requirements.

In an example embodiment, after the trained model is created, when an accuracy of a result of checking the reference product name information and the attribute information is reduced, a new trained model may be created or additional training may be performed by adjusting at least one of the above parameters.

FIGS. 9 and 10 are diagrams for describing reference product name information and attribute information checked according to an example embodiment of the present disclosure.

FIG. 9 is a diagram for describing a case in which the reference product name information is checked by the information providing apparatus according to an example embodiment of the present disclosure.

Referring to FIG. 9, the information providing apparatus may check a character string of "#1 CW BIO-DISPERSANTFOR" through at least one trained model. For example, the information providing apparatus may check reference product name information corresponding to the character string on the basis of analyzing of the character string using a first trained model. The information providing apparatus may provide the checked reference product name information. For example, the information providing apparatus may check "BIO-DISPERSANT," which is a reference product name that "#1 CW BIO-DISPERSANTFOR" represents, and provide information about the checking result.

In an example embodiment, the information providing apparatus may modify the input character string on the basis of the checked reference product name information. For example, the information providing apparatus may modify the character string into a character string of "#1 CW BIO-DISPERSANT" in correspondence with the fact that the reference product name information that the character string of "#1 CW BIO-DISPERSANTFOR" represents is "BIO-DISPERSANT."

FIG. 10 is a diagram for describing a case in which the attribute information is checked by the information providing apparatus according to an example embodiment of the present disclosure.

Referring to FIG. 10, the information providing apparatus may analyze the character string using a second trained model. The information providing apparatus may check attribute information representing the character string through the second trained model and provide the checked attribute information.

In an example embodiment, before the character string is input to the second trained model, tokenization may be performed on the character string on the basis of determining the reference product name information. For example, on the basis of performing tokenization on the attribute information corresponding to the reference product name information, the character string may be classified into one or more words. The attribute information corresponding to each word may be checked on the basis of analyzing the classified words through the second trained model.

In an example embodiment, on the basis of the tokenization, words constituting the character string may be classified for each type of the attribute information previously designated according to the reference product name information. For example, when the character string is a first reference product name and the pieces of previously designated attribute information are "SIZE," "FLOW RATE," "PUMPING HEAD," and "POWER," and of words constituting the character string according to the tokenization, "Q:10M3/HR HEAD:20M 3.7 KW" may be classified as being related to "SIZE."

However, since such tokenization is performed using components such as a space character or punctuation mark of the character string, "Q:10M3/HR HEAD:20M 3.7 KW" may be related to other attribute information (e.g., "FLOW RATE," "PUMPING HEAD," and "POWER") other than "SIZE." The information providing apparatus may check accurate attribute information by analyzing the tokenized word through the second trained model. A more specific description related to the tokenization may refer to FIG. 11.

That is, as illustrated in the drawing, the information providing apparatus may check the actual attribute information (e.g., "FLOW RATE," "PUMPING HEAD," and "POWER") by analyzing "Q:10M3/HR HEAD:20M 3.7 KW" through the second trained model. In addition, the words may be reconstructed according to the actual attribute information, and information about the reconstructed word may be provided as illustrated in the diagram.

However, the present disclosure is not limited thereto, and according to an example embodiment, the character string may be divided into words in a state in which the attribute information does not match. In this case, the information providing apparatus may apply the divided words to the second trained model, and may check the attribute information corresponding to the words.

Figure 11:
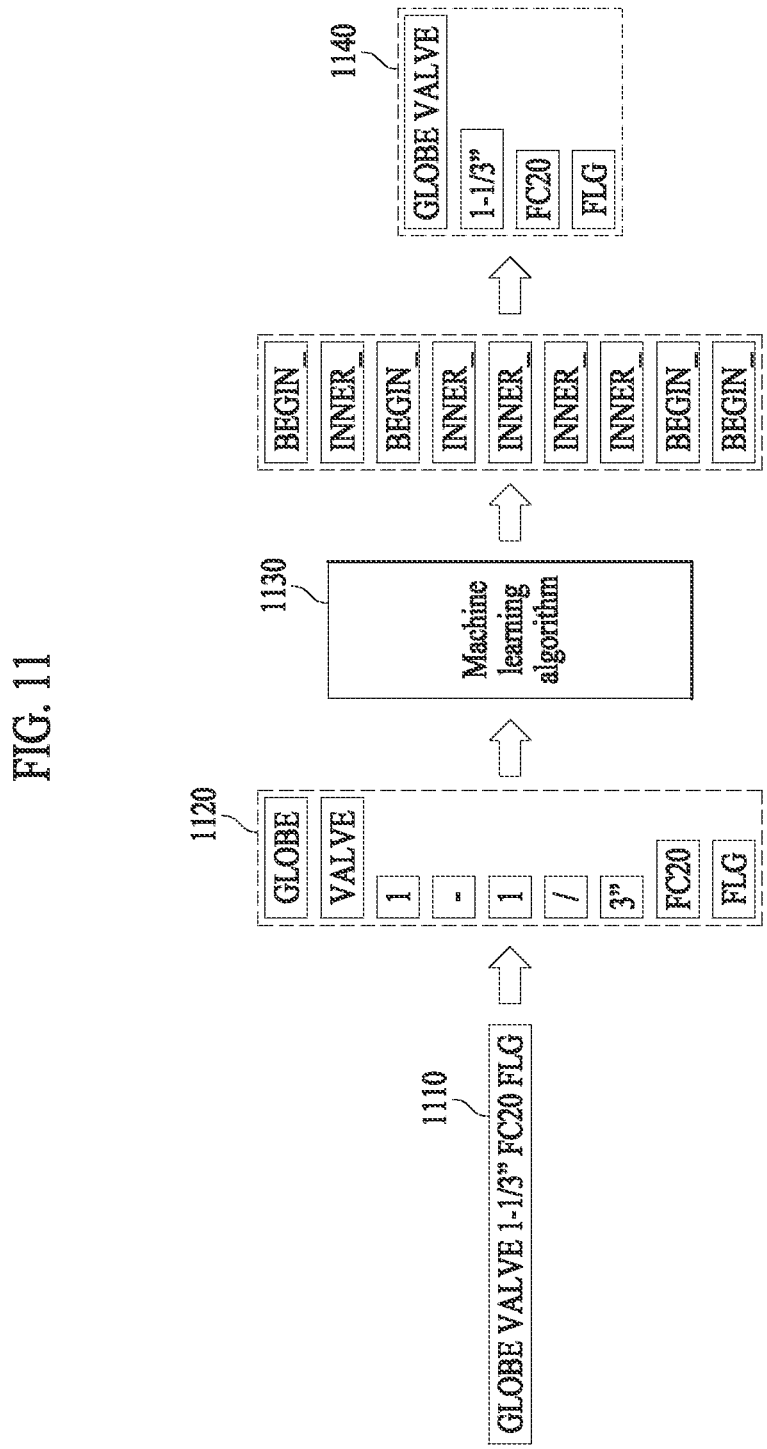
FIG. 11 is a diagram for describing a method of performing pre-processing before performing classification based on attribute information according to an example embodiment of the present disclosure.

FIG. 11 is a diagram for describing a method of performing pre-processing before performing classification on the basis of attribute information according to an example embodiment of the present disclosure.

In an example embodiment, each attribute information included in information about an item may be information that is classified using a delimiter, and may also be composed of a continuous character without a delimiter. When each of attribute items included in the information about the item is not distinguished and the information about the item input as a continuous character, it may be difficult to identify each attribute item without pre-processing. In this case, the item classification apparatus according to an example embodiment may pre-process the information about the item before performing the item classification.

Specifically, before calculating a similarity between pieces of information about items, the item classification apparatus, according to an example embodiment, may perform the pre-processing to identify each word included in the information about the item through machine learning.

Referring to FIG. 11, when information about an item is input as a continuous character string 1110, the item classification apparatus according to an example embodiment may classify characters in the continuous character string 1110 in units for tagging on the basis of a space character or a specific character. A character string 1120 in units for tagging is defined as a character string having a length less than that of a character string 1140 of a tokenization unit, and refers to units to which a start tag "BEGIN_" a contiguous tag "INNER_," and an end tag "O_" are added.

Thereafter, the item classification apparatus may add the tag to each unit for tagging of the character string 1120 using a machine learning algorithm 1130. For example, the "BEGIN_" tag may be added to "GLOBE" of FIG. 11, and the "INNER_" tag may be added to "/" of FIG. 11.

The item classification apparatus may recognize from a token to which the start tag "BEGIN_" is added to a token to which the end tag "O" is added as one word, or recognize from the token to which the start tag "BEGIN_" is added to a token before a token to which a next start tag "BEGIN_" is added as one word. Accordingly, the item classification apparatus may recognize the character string 1140 of a tokenization unit from the continuous character string 1110.

Thus, according to the method disclosed in FIG. 11, the item classification apparatus may classify the information about the item after identifying each token included in the information about the item.

The apparatus according to the example embodiments described above may include a processor, a memory for storing and executing program data, a permanent storage such as a disk drive, a communication port for communicating with external devices, and user interface devices, such as a touch panel, keys, buttons, and the like. Methods may be implemented with software modules or algorithms and may be stored as program instructions or computer-readable codes executable on a processor on a computer-readable recording medium. Examples of the computer-readable recording medium include magnetic storage media (e.g., a read-only memory (ROM), a random-access memory (RAM), floppy disks, hard disks, and the like), optical recording media (e.g., compact disc read-only memories (CD-ROMs), or digital versatile discs (DVDs)), and the like. The computer-readable recording medium may also be distributed over network coupled computer systems so that the computer-readable codes are stored and executed in a distributive manner. The media may be readable by the computer, stored in the memory, and executed by the processor.

The present example embodiment may be described in terms of functional block components and various processing operations. Such functional blocks may be implemented by any number of hardware and/or software components configured to perform the specified functions. For example, these example embodiments may employ various integrated circuit (IC) components, e.g., memory elements, processing elements, logic elements, look-up tables, and the like, which may perform various functions under the control of one or more microprocessors or other control devices. Similarly, where components are implemented using software programming or software components, the present example embodiments may be implemented with any programming or scripting language including C, C++, Java, Python, or the like, with the various algorithms being implemented with any combination of data structures, processes, routines or other programming components. Functional aspects may be implemented in algorithms that are executed on one or more processors. In addition, the present example embodiment may employ conventional techniques for electronics environment setting, signal processing and/or data processing and the like. The terms "mechanism," "element," "means," "configuration," and the like may be used in a broad sense and are not limited to mechanical or physical components. The term may include the meaning of a series of routines of software in conjunction with a processor or the like.

The above-described example embodiments are merely examples and other example embodiments may be implemented within the scope of the following claims.

What is claimed is:

1. A method of providing information using a trained model through machine learning, the method comprising:
    selecting a first set of character strings including a plurality of character strings representing pieces of information about a plurality of items related to a trained model creation, from a source character string set;
    creating at least one trained model on the basis of the first set of character strings;
    checking a second set of character strings including a plurality of character strings representing pieces of information about a plurality of items related to an information classification object, from the source character string set; and
    checking reference product name information and attribute information for each of at least a portion of the second set of character strings using the at least one trained model,
    wherein the character strings included in the source character string set have category information,
    wherein the first set of character strings is selected from the source character string set based on the category information, and wherein, for each category in the first set of character strings, a ratio of: i) a number of character strings included in the category to ii) a total number of character strings in the first set of character strings is equal to or greater than a reference ratio.

2. The method of claim 1, wherein:
the at least one trained model is created on the basis of the first set of character strings, and reference product name information and attribute information for the first set of character strings.

3. The method of claim 1, wherein the reference ratio is determined on the basis of at least one among types of the plurality of items, a length of the plurality of character strings, and the number of categories.

4. The method of claim 1, wherein the at least one trained model includes a first trained model related to deriving reference product name information and a second trained model related to deriving attribute information.

5. The method of claim 4, wherein the checking of the reference product name information and the attribute information comprises:
deriving reference product name information on the basis of the second set of character strings through the first trained model;
tokenizing at least a portion of each character string of the second set of character strings on the basis of the reference product name information; and
deriving attribute information on the basis of the tokenized character string through the second trained model.

6. The method of claim 5, wherein the tokenizing comprises:
tokenizing at least a portion of each character string of the second set of character strings on the basis of a space character included in the second set of character strings;
adding a tag to each of a plurality of tokens, which are generated on the basis of the tokenizing, through machine learning; and
determining one or more tokens as a word on the basis of the tag.

7. The method of claim 6, wherein the deriving of the attribute information comprises deriving attribute information through the second trained model on the basis of the determined word.

8. The method of claim 6, wherein:
the tags include a start tag, a continuous tag, and an end tag, and
the determining as the word comprises determining, as one word, from a token to which the start tag is added, to a token before a token to which the next start tag is added or to a token to which the end tag is added.

9. The method of claim 1, wherein the at least one trained model includes a convolutional neural network (CNN).

10. The method of claim 1, wherein, in the at least one trained model, training is performed using at least one of the number of training iterations, text number unit for training, the number of hidden units of a machine learning algorithm, a dimension of an output vector of the machine learning algorithm, a dropout of the output vector, a batch size of the machine learning algorithm, and a learning rate.

11. An apparatus for providing information using a trained model through machine learning, the apparatus comprising:
a memory comprising at least one instruction; and
a processor,
wherein, on the basis of the at least one instruction, the processor is configured to:
select a first set of character strings including a plurality of character strings representing pieces of information about a plurality of items related to a trained model creation, from a source character string set;
create at least one trained model on the basis of the first set of character strings;
check a second set of character strings including a plurality of character strings representing pieces of information about a plurality of items related to an information classification object, from the source character string set; and
check reference product name information and attribute information for each of at least a portion of the second set of character strings using the at least one trained model,
wherein the character strings included in the source character string set have category information,
wherein the first set of character strings is selected from the source character string set based on the category information, and
wherein, for each category in the first set of character strings, a ratio of: i) a number of character strings included in the category to ii) a total number of character strings in the first set of character strings is equal to or greater than a reference ratio.

12. A computer-readable non-transitory recording medium recording a program for executing a method of providing information using a trained model through machine learning on a computer,
wherein the method of providing information comprises:
selecting a first set of character strings including a plurality of character strings representing pieces of information about a plurality of items related to a trained model creation, from a source character string set;
creating at least one trained model on the basis of the first set of character strings;
checking a second set of character strings including a plurality of character strings representing pieces of information about a plurality of items related to an information classification object, from the source character string set; and
checking reference product name information and attribute information for each of at least a portion of the second set of character strings using the at least one trained model,
wherein the character strings included in the source character string set have category information,
wherein the first set of character strings is selected from the source character string set based on the category information, and
wherein, for each category in the first set of character strings, a ratio of: i) a number of character strings included in the category to ii) a total number of character strings in the first set of character strings is equal to or greater than a reference ratio.

* * * * *